US012728671B1

(12) United States Patent
Almahd

(10) Patent No.: US 12,728,671 B1
(45) Date of Patent: Sep. 8, 2026

(54) AXLE ASSEMBLY WITH INTEGRAL GUIDE

(71) Applicant: Schaeffler Technologies AG & Co. KG, Herzogenaurach (DE)

(72) Inventor: Dalal Almahd, Fairlawn, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 19/192,938

(22) Filed: Apr. 29, 2025

(51) Int. Cl.
*B60B 35/16* (2006.01)
*B60K 1/00* (2006.01)

(52) U.S. Cl.
CPC ...... *B60B 35/163* (2013.01); *B60K 2001/001* (2013.01)

(58) Field of Classification Search
CPC ..... B60B 35/16; B60B 35/163; F16H 57/021; F16H 57/029; F16H 57/037; F16H 2057/02052; B60K 1/00; B60K 2001/001
See application file for complete search history.

(56) References Cited

U.S. PATENT DOCUMENTS

| | | | | |
|---|---|---|---|---|
| 1,583,789 A * | 5/1926 | Goode | B60B 35/16 | 74/607 |
| 1,955,824 A * | 4/1934 | Mogford | B60B 35/16 | 72/359 |
| 4,048,466 A * | 9/1977 | Toth | B23K 15/04 | 219/121.14 |
| 6,354,414 B1 * | 3/2002 | Sueshige | B60K 7/0007 | 192/45.005 |
| 7,846,056 B2 * | 12/2010 | Chludek | F16H 57/037 | 475/231 |
| 8,936,130 B2 * | 1/2015 | Hirashita | B66F 9/07586 | 180/300 |
| 9,897,192 B2 * | 2/2018 | Tahara | F16H 57/0421 | |
| 12,454,151 B1 * | 10/2025 | Bahena | F16H 57/037 | |
| 2023/0110432 A1 * | 4/2023 | Laforce | F16H 57/029 | 310/54 |
| 2025/0230867 A1 * | 7/2025 | Salgado | F16H 57/037 | |

FOREIGN PATENT DOCUMENTS

| | | | |
|---|---|---|---|
| CN | 105752049 A * | 7/2016 | B60T 1/062 |
| CN | 106335360 A * | 1/2017 | B60B 35/125 |
| CN | 106585276 A * | 4/2017 | B60B 35/122 |
| CN | 108068547 A * | 5/2018 | B60B 35/16 |
| CN | 108482014 A * | 9/2018 | B60B 35/163 |
| CN | 109421433 A * | 3/2019 | B60K 17/165 |
| CN | 113581357 A * | 11/2021 | B60B 35/16 |
| FR | 749727 A * | 7/1933 | |

OTHER PUBLICATIONS

Chamfer Wikipedia webpage; https://en.wikipedia.org/wiki/Chamfer.*

* cited by examiner

*Primary Examiner* — Adam D Rogers
(74) *Attorney, Agent, or Firm* — Price Heneveld LLP

(57) ABSTRACT

An electric axle assembly includes a housing and a differential disposed in the housing. A gear of the differential extends along a central axis and is configured to couple with a shaft. A beam is coupled with the housing and defines a beam hollow for housing the shaft. A guide is integral with the housing and defines a passage that forms an inner surface of the guide. The inner surface tapers axially.

15 Claims, 3 Drawing Sheets

AXLE ASSEMBLY WITH INTEGRAL GUIDE

FIELD OF THE DISCLOSURE

The present disclosure generally relates to an axle assembly with an integral guide. More specifically, the present disclosure relates to a guide integrally formed in a housing of an electric axle assembly.

BACKGROUND OF THE DISCLOSURE

Shaft guide components are known. These components are typically provided separately from a housing in which the shaft can be inserted.

SUMMARY OF THE DISCLOSURE

According to a first aspect of the present disclosure, an electric axle assembly includes a housing and a differential disposed in the housing. A gear of the differential extends along a central axis and is configured to couple with a shaft. A beam is coupled with the housing and defines a beam hollow for housing the shaft. A guide is integral with the housing and defines a passage that forms an inner surface of the guide. The inner surface tapers axially.

Embodiments of the first aspect of the disclosure can include any one or a combination of the following features:

- the passage has a first diameter at a first axial position of the passage and a second diameter at a second axial position axially spaced from the first axial position toward the differential, wherein the first diameter is greater than the second diameter and the inner surface tapers from the first axial position toward the second axial position;
- the inner surface extends at an angle of between a 40° and 50° between the first axial position and the second axial position;
- the guide includes an annular portion having the second diameter;
- the guide includes a frusto-conical portion extending from the annular portion, wherein the passage has a third diameter greater than the second diameter in the frusto-conical portion;
- a seal, wherein the housing defines an interior, and wherein the housing defines a groove in the interior in which the seal is disposed;
- the housing includes a wall bounding the groove, wherein engagement of the seal with the wall limits radial movement of the seal in the groove;
- the groove forms a ledge extending at a non-zero angle relative to the central axis;
- the ledge extends orthogonally relative to the central axis; and
- the engagement of the seal with the ledge limits axial movement of the seal.

According to a second aspect of the present disclosure, an electric axle assembly, includes a housing and a differential disposed in the housing. A gear of the differential extends along a central axis and is configured to couple with a shaft. The electric axle assembly includes a beam coupled with the housing and defining a beam hollow for housing the shaft and a guide integral with the housing and defining a passage that forms an inner surface of the guide. The passage has a first diameter at a first axial position of the passage and a second diameter at a second axial position axially spaced from the first axial position toward the differential. The first diameter is greater than the second diameter and the inner surface tapers from the first axial position toward the second axial position.

Embodiments of the second aspect of the disclosure can include any one or a combination of the following features:

- the inner surface tapers at an angle of between a 40° and 50° relative to the central axis.
- the guide includes an annular portion having the second diameter;
- the inner surface terminates at the first axial position, and wherein the electric axle assembly does not include a guide component that is both not integrally formed with the housing and distal from the first axial position;
- the guide includes a frusto-conical portion extending from the annular portion, wherein the passage has a third diameter greater than the second diameter in the frusto-conical portion;
- a seal bounding an interior of the housing, and wherein the housing defines a groove in which the seal is disposed;
- the groove forms a ledge extending at a non-zero angle relative to the central axis, wherein engagement of the seal with the ledge limits axial movement of the seal toward an exterior of the housing;
- the ledge extends orthogonally relative to the central axis; and
- the groove housing includes a wall bounding the groove, wherein engagement of the seal with the wall limits radial movement of the seal in the groove.

According to a third aspect of the present disclosure, an electric axle assembly includes a housing, a shaft, a differential disposed in the housing and operably coupled with the shaft, a beam coupled with the housing and defining a beam hollow for housing the shaft, and a guide integral with the housing and defining a passage that forms an inner surface of the guide. The passage has a first diameter at a first axial position of the passage and a second diameter at a second axial position axially spaced from the first axial position toward the differential. The first diameter is greater than the second diameter and the inner surface tapers from the first axial position toward the second axial position. A seal engages the housing to limit axial movement in a direction away from the differential.

These and other features, advantages, and objects of the present disclosure will be further understood and appreciated by those skilled in the art by reference to the following specification, claims, and appended drawings.

Figure 1:
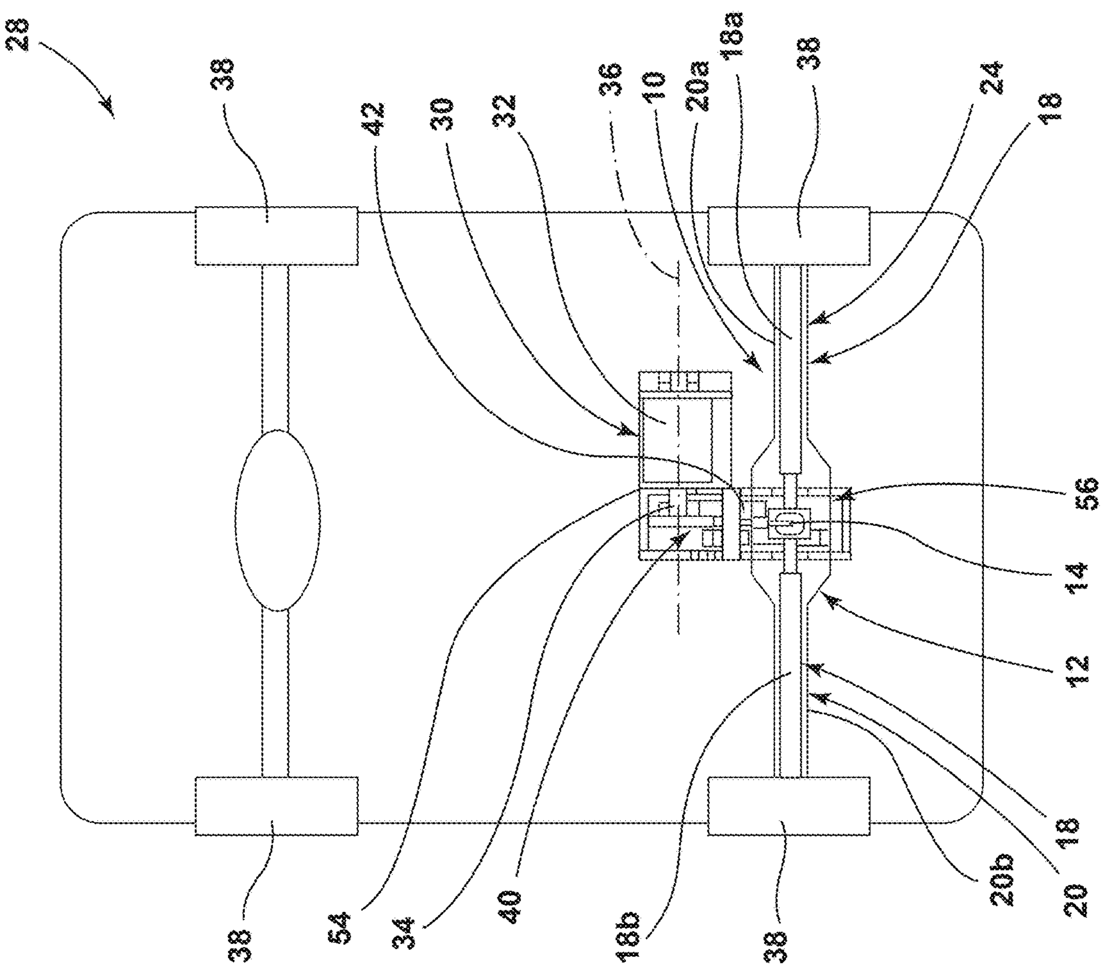
FIG. 1 is schematic view of a vehicle illustrating an electric axle assembly of a vehicle.

The components in the figures are not necessarily to scale, emphasis instead being placed upon illustrating the principles described herein.

DETAILED DESCRIPTION

Additional features and advantages of the disclosure will be set forth in the detailed description which follows and will be apparent to those skilled in the art from the description, or recognized by practicing the disclosure as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first" and "second," "top" and "bottom," and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein, the terms "the," "a," or "an," mean "at least one," and should not be limited to "only one" unless explicitly indicated to the contrary. Thus, for example, reference to "a component" includes embodiments having two or more such components unless the context clearly indicates otherwise.

As used herein, the term "axial" and derivatives thereof, such as "axially," shall be understood to refer to a direction along the axis of a shaft configured to rotate in operation of the apparatus described herein. Further, the term "radial" and derivatives thereof, such as "radially," shall be understood in relation to the axis of the aforementioned shaft. For example, "radially outboard" refers to further away from the axis, while "radially inboard" refers to nearer to the axis. The term "circumferential" and derivatives thereof, such as "circumferentially," shall be understood in relation to the axis of the aforementioned shaft.

Figure 2:
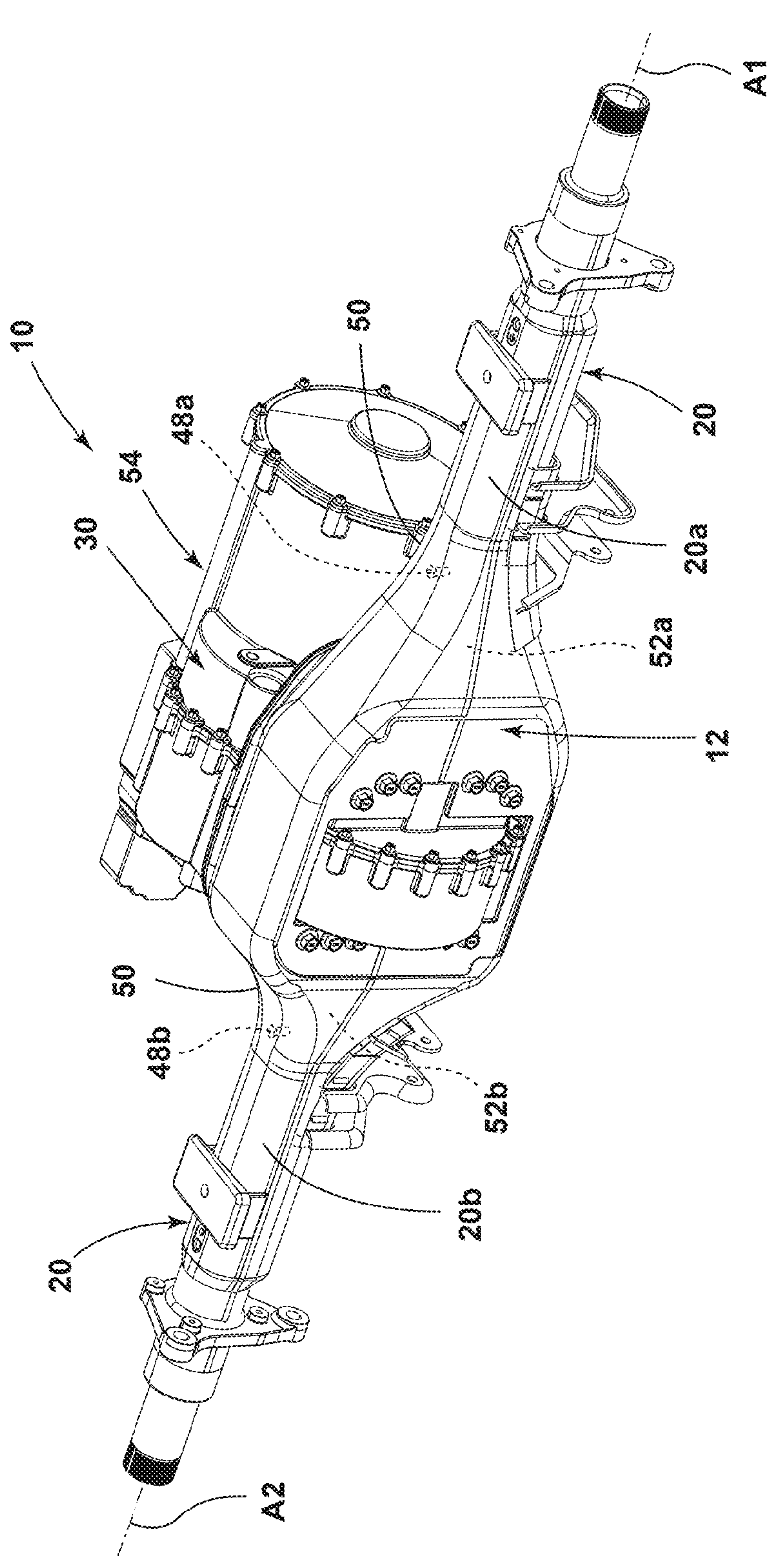
FIG. 2 is a perspective view of an electric axle assembly.
Figure 3:
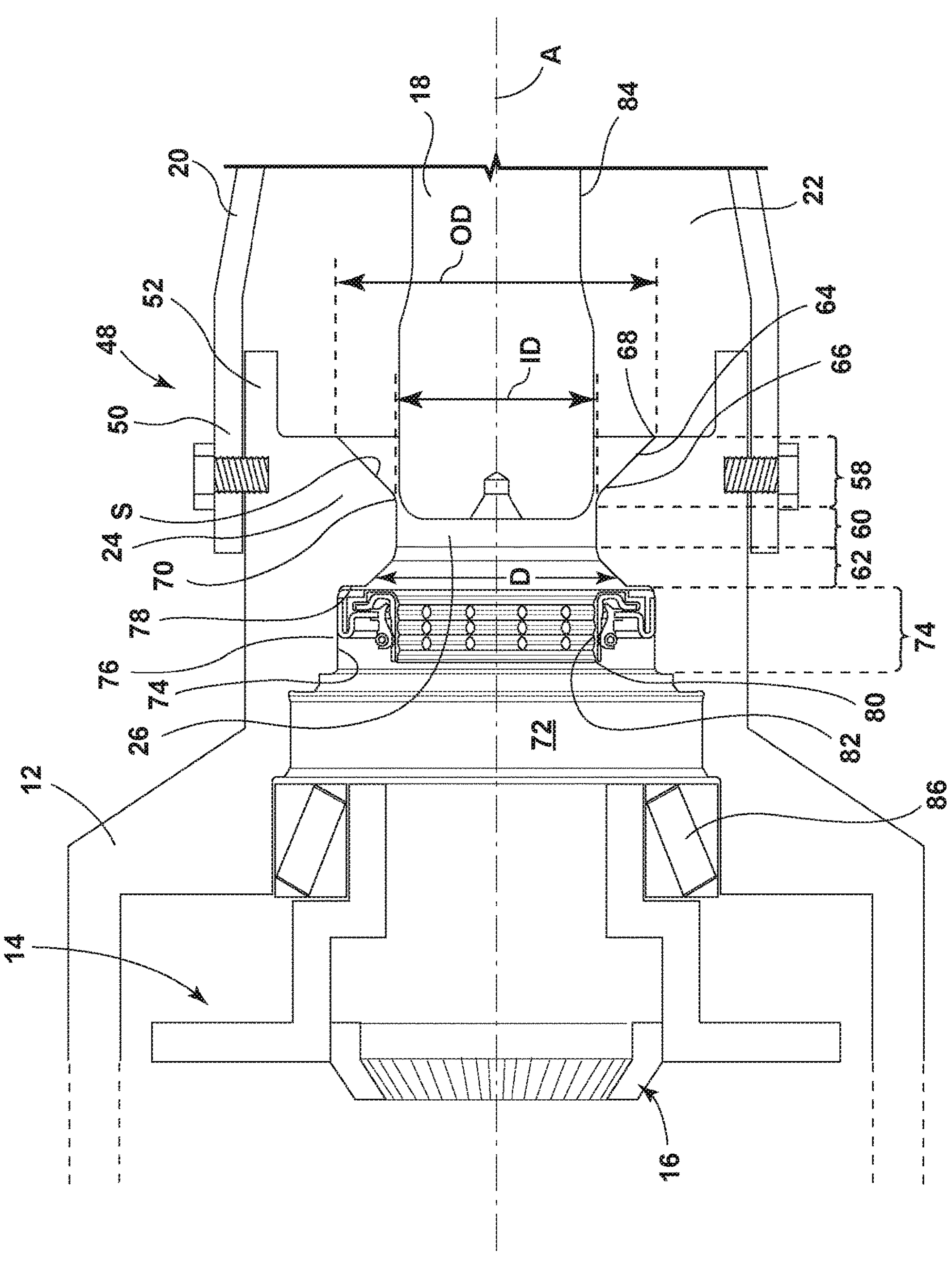
FIG. 3 is a partial cut-away view of a portion of an electric axle assembly proximate a junction of a housing and a beam of the electric axle assembly demonstrating an integrated guide for a half-shaft.

Referring to FIGS. 1-3, an electric axle assembly 10 includes a housing 12 and a differential 14 disposed in the housing 12. A gear 16 of the differential 14 extends along a central axis A and is configured to couple with a shaft 18. A beam 20 is coupled with the housing 12 and defines a beam hollow 22 for housing the shaft 18. A guide 24 is integral with the housing 12 and defines a passage 26 that forms an inner surface S of the guide 24. The inner surface S tapers axially.

Referring now to FIG. 1, a vehicle 28 is illustrated. The vehicle 28 may be an electric vehicle and/or a hybrid electric vehicle. In the embodiment illustrated in FIG. 1, the vehicle 28 includes an electric axle assembly 10. The electric axle assembly 10 can include an electric drive unit 30, at least a portion of which can be disposed in the housing 12. The electric drive unit 30 can include a motor 32. The motor 32 can include a stator and a rotor (not shown) and may be configured to drive rotation of a rotor shaft 34 about a drive axis 36. In various implementations, the rotor shaft 34 is operably coupled with at least one wheel 38 of the vehicle 28 such that rotation of the rotor shaft 34 drives rotation of the at least one wheel 38. In various implementations, the electric drive unit 30 of the vehicle 28 includes a gear system 40. In the exemplary embodiment illustrated in FIG. 1, the electric drive unit 30 includes a transmission 42 and a differential 14. The transmission 42 and differential 14 are operably coupled with the rotor shaft 34. The shafts 18 are operably coupled with the differential 14 and include a first shaft 18*a* and a second shaft 18*b*. As such, rotation of the rotor shaft 34 by the electric motor 32 may drive rotation of the first shaft 18*a* and the second shaft 18*b*, which may be half-shafts, and the attached rear wheels of the vehicle 28 via the operable coupling of the first and second shafts 18*a*, 18*b* to the rotor shaft 34 by the gear system 40.

Referring now to FIGS. 1 and 2, at least one beam 20 extends from the housing 12 along a central axis A. For example, the at least one beam 20 can include a first beam 20*a* that extends along a first central axis A1 and a second beam 20*b* that extends from the housing 12 opposite the first beam 20*a* along a second central axis A2. The first and second central axes A1, A2 may be coaxial. Each beam 20 defines a beam hollow 22 that is in communication with the receiving space. The beams 20 operably couple with the housing 12 at junctions 48. For example, a proximal portion 50 of the first beam 20*a* can be fastened, welded, or otherwise coupled with the housing 12 adjacent a first distal portion 52*a* of the housing 12 at a first junction 48*a*, and a proximal portion 50 of the second beam 20*b* can be coupled with the housing 12 adjacent a second distal portion 52*b* at a second junction 48*b*. In various implementations, housing 12 is configured to be mounted to an underside of the vehicle 28.

With continued reference to FIGS. 1 and 2, in various implementations, the housing 12 can receive at least a portion of the electric drive unit 30. While demonstrated as a banjo-axle, it is contemplated that the guide 24 of the present disclosure can be incorporated into a housing 12 of various types of axle assembly. The housing 12 can define a motor housing region 54 and a gearbox region 56. The motor 32 of the electric drive unit 30 may be housed within the motor housing region 54 and the gear system 40 (e.g., the transmission 42 and/or differential 14) of the electric drive unit 30 may be housed within the gearbox region 56 of the housing 12. In various implementations, the housing 12 of the electric drive unit 30 can be an assembly of a plurality of components. For example, the housing 12 can be a die-cast aluminum housing that is formed of a plurality of components that are fastened to each other. As such, the guide 24 can be die-cast aluminum integrally formed as part of the housing 12. The guide 24 cane be unitary with at least a portion of the housing 12.

Referring now to FIG. 3, the guide 24 is shown adjacent a junction 48 of the housing 12 and a beam 20. It is contemplated that, while a single guide 24 is shown in reference to one end of the housing 12 and one shaft 18, another guide 24 may be provided at an opposite end of the housing 12 for guiding another shaft 18 (e.g., a first guide for the first shaft 18*a* and a second guide for the second shaft 18*b*). At the junction 48, the beam 20 couples with the housing 12. For example, the proximal portion 50 of the beam 20 can couple with a distal portion 52 of the housing 12. The housing 12 has an integrally-formed guide 24. For example, the guide 24 can be cast in common with/part of the housing 12. The guide 24 can serve to guide a shaft 18 into the housing 12 and along the central axis A during assembly of the electric axle assembly 10. The electric axle assembly 10 may not include a guide component that is both not integrally formed with the housing 12 and distal from the first axial position 64. For example, the axle assembly 10 can be free from other integrally-formed guides distal from the distal portion 52 of the housing 12. The guide 24 defines a passage 26 formed in the housing 12. The guide 24 can include a first portion 58, a second portion 60 axially spaced toward the differential 14 from the first portion 58, and a third portion 62 axially spaced toward the differential 14 from the second portion 60. The first and third portions 58, 62 can have a varying diameter. For example, one or both of the first and third portions 58, 62 can includes fillets, chamfers, tapers, bevels, blends, inward flares, coves, sweeps, curls, splines, or any other feature that can provide a gradual change in diameter moving in the axial direction. The second portion 60 can have a substantially consistent diameter.

The guide 24 includes an inner surface S, at least a portion of which extends at an oblique angle relative to the central axis A. For example, the inner surface S can taper between a first axial position 64 and a second axial position 66 at the first portion 58. Examples of the first and second axial positions 64, 66 are illustrated in FIG. 3. In some examples, the first axial position 64 is at an outer terminus 68 of the inner surface S (e.g., a distal end of the passage 26). The passage 26 can have an outer diameter OD at the outer terminus 68. In some examples, the second axial position 66 terminates at an inner terminus 70 of the inner surface S. The passage 26 can have an inner diameter ID at the inner terminus 70. As shown, the inner diameter ID can be less than the outer diameter OD. The first portion 58 can be frusto-conical in shape. By gradually reducing the diameter of the passage 26 from the distal portion 52 of the housing 12 toward a central portion of the housing 12 (e.g., the interior 72), the inner surface S can guide the shaft 18 into the housing 12 in the event that the shaft 18 is off-center during assembly, such that the shaft 18 can contact the inner surface S during movement of the shaft 18 toward the differential 14 and assist in aligning the shaft 18 onto the central axis A.

The inner surface S can taper from the first axial position 64 toward the second axial position 66 at an angle of between a 40° and 50° relative to the central axis A at the first portion 58. In other examples, the tapering angle is more than 50° or less than 40°. In some examples, the angle is 45°.

The second portion 60 can have the inner diameter ID. The second portion 60 can form a portion of the inner surface S that extends axially, such that the inner surface S forms an annular shape. The inner diameter ID can be within 10% of a diameter of the shaft 18. For example, the inner diameter ID may be between 101% and 105% of the diameter of the diameter of the shaft 18. The outer diameter OD may be between 105% and 150% of the diameter of the shaft 18. The second portion 60 can have an annular shape such that the diameter of the second portion 60 is constant. For example, the third portion 62 can be a frusto-conical portion extending from the second portion 60 (e.g., an annular portion), thereby resulting in the passage 26 having a third diameter D greater than the second diameter in the second portion 60 (the inner diameter ID).

The housing 12 can define an interior 72 in which the differential 14 is disposed. The interior 72 can be axially bounded by a sealed contact between the axle and the housing 12 when the second portion 60 when the axle is installed. As such, the interior 72 can be bounded at one end of the third portion 62. The third portion 62 can be shaped similarly to the shape of the first portion 58. For example, the third portion 62 may be a mirrored portion relative to the first portion 58, such that the diameter of the third portion 62 gradually increases in an axial direction from the second portion 60 toward the differential 14.

With continued reference to FIG. 3, the passage 26 can include a groove 74 that extends at least partially annularly and forms a part of the interior 72. The groove 74 can have a groove diameter greater than the third diameter. In some examples, the groove 74 diameter is greater than any diameter of the third portion 62. The housing 12 can include a wall 76 that extends axially and a ledge 78 that extends from the wall 76 at a non-zero angle relative to the central axis A. For example, the ledge 78 can extend a direction orthogonal to the central axis A and/or the wall 76. The groove 74 can form the wall 76 and the ledge 78 to act as a stop for a seal 80 disposed in the groove 74 via the seal 80 engaging the wall 76. The engagement of the wall 76 limits radial movement of the seal 80 in the groove 74. The seal 80 also engages the ledge 78. Engagement of the seal 80 with the ledge 78 limits axial movement of the seal 80 in the groove 74. For example, the seal 80 can be installed in the groove 74 from the interior 72, and the ledge 78 can act as a stop to prevent the seal 80 from axial movement beyond the ledge 78 in a direction of the installation. For example, engagement of the seal 80 with the ledge 78 can limit axial movement of the seal 80 toward an exterior of the housing 12.

The seal 80 may include one or a plurality of components that can include elastic material or a combination of non-elastomeric material and elastomeric material. The seal 80 can include nitrile rubber (NBR), fluoroelastomer (Viton), silicone, or another sealing material. The seal 80 can include a metal reinforcement ring for structural integrity and a spring-loaded lip to maintain a tight seal against the rotating shaft. The seal 80 can assist in maintaining lubricant of the differential 14 in the housing 12 from leaving the interior 72 via the passage 26.

During installation, the shaft 18 can be inserted into passage 26 and into the interior 72 of the housing 12 and guided along the central axis A by the guide 24. If the shaft 18 contacts the guide 24, the gradual reducing of the diameter of the passage 26 guides the shaft 18 into the second portion 60 and aligns the shaft 18 on the central axis A. The seal 80 is installed in the groove 74 from the interior 72 of the housing 12. The seal 80 can be fitted into the groove 74 in a direction toward the distal portion 52 of the housing 12 to a hard stop caused by the ledge 78. An interior portion 82 of the seal 80 can engage an outer surface 84 of the shaft 18 to fluidly seal oil within the housing 12. The shaft 18 engages with the differential 14, which is supported in the housing 12 at least via bearing assemblies 86 that allow rotation of the differential 14 relative to the housing 12.

In general, the electric axle assembly 10 can provide for reduced manufacturing costs and complexity. By providing the guide 24 integrally formed with the housing 12, the guide 24 can be cast with the housing 12. The cast shape of the housing 12 can also enhance sealing and assembly processes by providing a hard stop from movement of the seal 80 in a direction away from the interior 72.

It is to be understood that variations and modifications can be made on the aforementioned structure without departing from the concepts of the present disclosure, and further it is to be understood that such concepts are intended to be covered by the following claims unless these claims by their language expressly state otherwise.

LIST OF REFERENCE NUMERALS

10 axle assembly
12 housing
14 differential
16 gear
A central axis
A1 first central axis
A2 second central axis
18 shafts
18*a* first shaft
18*b* second shaft
20 beam
20*a* first beam
20*b* second beam
22 beam hollow
24 guide
26 passage
S inner surface
28 vehicle
30 electric drive unit
32 motor
34 rotor shaft
36 drive axis
38 wheel
40 gear system
42 transmission
48 junctions
48*a* first junction
48*b* second junction
50 proximal portion
52 distal portion
52*a* first distal portion
52*b* second distal portion
54 motor housing region
56 gearbox region
58 first portion
60 second portion
62 third portion
64 first axial position
66 second axial position
68 outer terminus
OD outer diameter
70 inner terminus
ID inner diameter
72 interior
74 groove
76 wall
78 ledge
80 seal
82 interior portion
84 outer surface
86 bearing assembly

What is claimed is:

1. An electric axle assembly, comprising:
- a housing;
- a differential disposed in the housing, wherein a gear of the differential extends along a central axis and is configured to couple with a shaft;
- a beam coupled with the housing and defining a beam hollow for housing the shaft; and
- a guide integral with the housing and defining a passage that forms an inner surface of the guide, wherein the inner surface tapers axially, wherein the passage has a first diameter at a first axial position of the passage and a second diameter at a second axial position axially spaced from the first axial position toward the differential, wherein the first diameter is greater than the second diameter and the inner surface tapers from the first axial position toward the second axial position, wherein the guide includes an annular portion having the second diameter, wherein the guide includes a frusto-conical portion extending from the annular portion, and wherein the passage has a third diameter greater than the second diameter in the frusto-conical portion.

2. The electric axle assembly of claim 1, wherein the inner surface extends at an angle between 40° and 50° between the first axial position and the second axial position.

3. The electric axle assembly of claim 1, comprising:
- a seal, wherein the housing defines an interior, and wherein the housing defines a groove in the interior in which the seal is disposed.

4. The electric axle assembly of claim 3, wherein the housing includes a wall bounding the groove, wherein engagement of the seal with the wall limits radial movement of the seal in the groove.

5. The electric axle assembly of claim 3, wherein the groove forms a ledge extending at a non-zero angle relative to the central axis.

6. The electric axle assembly of claim 5, wherein the ledge extends orthogonally relative to the central axis.

7. The electric axle assembly of claim 5, wherein engagement of the seal with the ledge limits axial movement of the seal.

8. An electric axle assembly, comprising:
- a housing;
- a differential disposed in the housing, wherein a gear of the differential extends along a central axis and is configured to couple with a shaft;
- a beam coupled with the housing and defining a beam hollow for housing the shaft; and
- a guide integral with the housing and defining a passage that forms an inner surface of the guide, wherein the passage has a first diameter at a first axial position of the passage and a second diameter at a second axial position axially spaced from the first axial position toward the differential, wherein the first diameter is greater than the second diameter and the inner surface tapers from the first axial position toward the second axial position, wherein the guide includes an annular portion having the second diameter, wherein the guide includes a frusto-conical portion extending from the annular portion, and wherein the passage has a third diameter greater than the second diameter in the frusto-conical portion.

9. The electric axle assembly of claim 8, wherein the inner surface tapers at an angle between 40° and 50° relative to the central axis.

10. The electric axle assembly of claim 8, wherein the inner surface terminates at the first axial position, and wherein the electric axle assembly does not include a component of the guide that is both not integrally formed with the housing and distal from the first axial position.

11. The electric axle assembly of claim 8, comprising:

a seal bounding an interior of the housing, and wherein the housing defines a groove in which the seal is disposed.

12. The electric axle assembly of claim 11, wherein the groove forms a ledge extending at a non-zero angle relative to the central axis, wherein engagement of the seal with the ledge limits axial movement of the seal toward an exterior of the housing.

13. The electric axle assembly of claim 12, wherein the ledge extends orthogonally relative to the central axis.

14. The electric axle assembly of claim 13, wherein the groove housing includes a wall bounding the groove, wherein engagement of the seal with the wall limits radial movement of the seal in the groove.

15. An electric axle assembly, comprising:

a housing;

a shaft;

a differential disposed in the housing and operably coupled with the shaft;

a beam coupled with the housing and defining a beam hollow for housing the shaft;

a guide integral with the housing and defining a passage that forms an inner surface of the guide, wherein the passage has a first diameter at a first axial position of the passage and a second diameter at a second axial position axially spaced from the first axial position toward the differential, wherein the first diameter is greater than the second diameter and the inner surface tapers from the first axial position toward the second axial position, wherein the guide includes an annular portion having the second diameter, wherein the guide includes a frusto-conical portion extending from the annular portion, and wherein the passage has a third diameter greater than the second diameter in the frusto-conical portion; and a seal engaging the housing to limit axial movement in a direction away from the differential.

* * * * *